US008428621B2

(12) United States Patent
Vorbau et al.

(10) Patent No.: US 8,428,621 B2
(45) Date of Patent: Apr. 23, 2013

(54) LOCATION-BASED AUDIO SERVICE

(75) Inventors: W. Alex Vorbau, Los Altos, CA (US); Anupriya Ankolekar, Sunnyvale, CA (US); Michael J. Brzozowski, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 261 days.

(21) Appl. No.: 12/847,058

(22) Filed: Jul. 30, 2010

(65) Prior Publication Data

US 2012/0028566 A1 Feb. 2, 2012

(51) Int. Cl.
*H04H 20/71* (2008.01)

(52) U.S. Cl.
USPC ................................ 455/456.3; 455/556.1

(58) Field of Classification Search .................. 455/3.03, 455/456.1, 456.3, 556.1
See application file for complete search history.

(56) References Cited

U.S. PATENT DOCUMENTS

| 7,525,450 | B2 | 4/2009 | Miller et al. | |
|---|---|---|---|---|
| 2005/0266879 | A1* | 12/2005 | Spaur et al. | 455/556.2 |
| 2008/0194323 | A1 | 8/2008 | Merkli et al. | |
| 2009/0171780 | A1* | 7/2009 | Aldrey et al. | 705/14 |
| 2009/0216446 | A1 | 8/2009 | Maran et al. | |
| 2010/0008265 | A1 | 1/2010 | Freer | |
| 2012/0041835 | A1* | 2/2012 | Broms et al. | 705/26.3 |

OTHER PUBLICATIONS

Tikander, Miikka; "An Augmented Reality Audio Headset"; Department of Signal Processing and Acoustics, Helsinki University of Technology Finland; Sep. 1-4, 2008; 4 Pages.

Harma, Aki; "Augmented Reality Audio for Mobile and Wearable Appliances"; Helsinki University of Technology, Finland, Nokia Research Center, Nokia Group, Finland; Jun. 2004; vol. 52 on pp. 618-639.

Peltola, Mikko; "Augmented Reality Audio Application in Outdoor Use"; Feb. 23, 2009; 75 pages.

* cited by examiner

Primary Examiner — Sam Bhattacharya
(74) Attorney, Agent, or Firm — Romiwa C. Akpala

(57) ABSTRACT

Embodiments of the present invention provide a location-based audio service. According to one embodiment, a request for a desired audio stream having an inactive segment is received from a user operating a mobile device. Furthermore, geographic data may be monitored while the audio stream is being rendered on the mobile device. The location-based audio service is configured to determine relevant location-based information based on the geographic data, and then transmit the relevant information to the mobile device during the inactive segment of the desired audio stream.

20 Claims, 5 Drawing Sheets

LOCATION-BASED AUDIO SERVICE

BACKGROUND

The emergence and popularity of mobile computing has made various types of portable electronic devices a staple in today's marketplace. In addition to mobile networking, many mobile devices are now equipped with the technological capabilities for enabling rich location-based services. For example, global positioning and compass sensors are often included in such devices for communicating the geographic location and the facing direction of the user, respectively. Furthermore, modern high-speed wireless networks are capable of delivering rich media in real-time. Due to the copious amount of information available on the interne, however, only a fraction of the available information can be presented to the user at any given time.

BRIEF DESCRIPTION OF THE DRAWINGS

The features and advantages of the inventions as well as additional features and advantages thereof will be more clearly understood hereinafter as a result of a detailed description of particular embodiments of the invention when taken in conjunction with the following drawings in which.

NOTATION AND NOMENCLATURE

Figure 1:
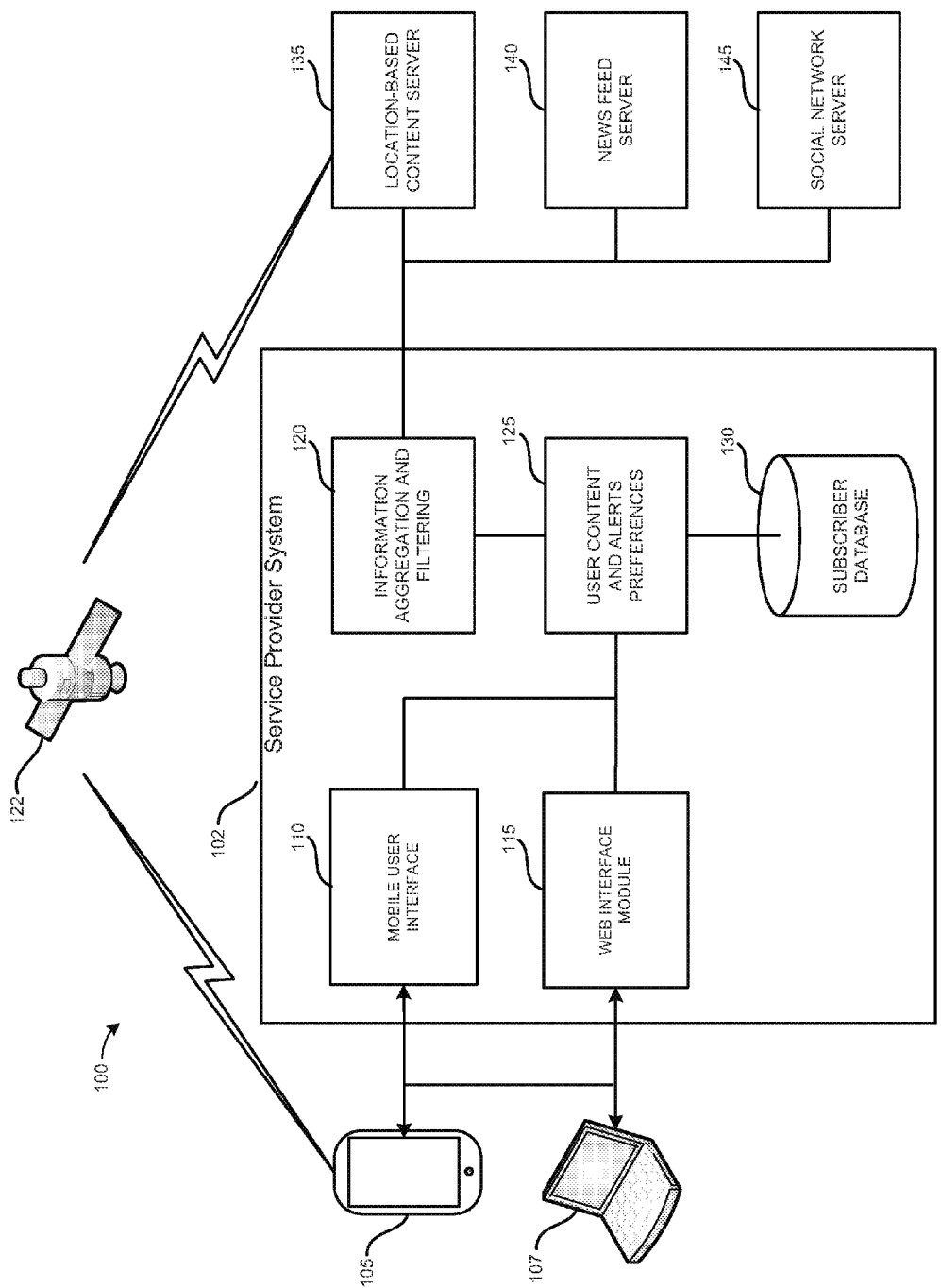
FIG. 1 is a simplified block diagram a system implementing the location-based audio services according to an embodiment of the present invention.

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" and "e.g." are used in an open-ended fashion, and thus should be interpreted to mean "including, but not limited to . . .". The term "couple" or "couples" is intended to mean either an indirect or direct connection. Thus, if a first component couples to a second component, that connection may be through a direct electrical connection, or through an indirect electrical connection via other components and connections, such as an optical electrical connection or wireless electrical connection. Furthermore, the term "system" refers to a collection of two or more hardware and/or software components, and may be used to refer to an electronic device or devices, or a sub-system thereof.

DETAILED DESCRIPTION OF THE INVENTION

The following discussion is directed to various embodiments. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

One solution to the aforementioned problem is to overlay information from the interne on a user's view of the physical world, or "augmented reality." This method involves a user waving the mobile device around the horizon and looking so as to monitor the physical world though the lens of the mobile device's built-in camera. However, such an experience is often uncomfortable for the user, both physically and socially, after a significant period of time. Other applications include proving a heads-up display of the world so that as the user points their phone at a location or object in physical space, the application overlays information onto the screen related to target location or object. Like the former method, this approach will also result in the user's arms and upper body becoming fatigued after extended use, while also portraying a look of senselessness to onlookers.

Embodiments of the present invention aim to solve the aforementioned problems by delivering a practical and personal augmented reality experience that utilizes audio as a primary mode of interaction. For example, the location-based audio service in accordance with one embodiment receives a service request from a subscribing user operating a mobile device. The system associated with the Service Provider of the location-based audio service (hereinafter "Service Provider System") monitors geographic data while the audio stream is being rendered on the mobile device. Relevant location-based information is then determined based on the geographic data and subscriber profile information, and in turn, transmitted to the mobile device during the inactive segment of the desired audio stream.

Moreover, embodiments of the present invention provide several advantages over conventional methods. For example, since users of mobile device are accustomed to listening to audio while walking or driving, audible delivery of location-based information enables users to safely continue these tasks without interruption. Furthermore, personalization and subtle delivery of location-based data ensures that the user is not continually inundated with sizable amounts of irrelevant and elaborate information.

Referring now in more detail to the drawings in which like numerals identify corresponding parts throughout the views, FIG. 1 is a simplified block diagram of a system implementing the location-based audio service according to an embodiment of the present invention. As shown here, the location-based audio system 100 includes mobile devices 105 and 107, a Service Provider System 102, and external content 135, 140 and 145. Mobile devices 105 and 107 represent a portable electronic device having network connectivity such as a smartphone 105, a notebook computer 107, or similar device. The Service Provider System 102 includes data processing components and modules configured to retrieve and transmit desired location-based information. According to one embodiment, the external content represents websites and network data utilized by the service provider system for generating the relevant location-based information for a particular user.

Service Provider System 102 includes multiple functional components including mobile user interface 110, web interface module 115, information aggregation and filtering component 120, user content and alerts preferences module 125, and subscriber database 130. According to one embodiment, the mobile user interface 110 represents an application programming interface for allowing the user to interact with service provider system 100 via mobile device 105. Similarly, web interface module 107 represents an application programming interface for allowing the user to interact with the service provider system 100 via mobile device 107 for example. In particular, the mobile user interface 110 and web interface module allow the user to make configuration changes and see a visual representation of information when needed. The subscriber database 130 is configured to store profile information associated with each user that subscribers with the Service Provider System 102. Such profile information may include a unique identifier associated with an individual user, preferred content including desired musical entertainment, restaurants, and shopping establishments for example, in addition to notification preferences which may indicate the timing and amount of information the user would like to receive from the Service Provider System 102. Furthermore, the user content and alert preferences module 125 is configured to process a user request submitted via the mobile user interface or the web interface module 115, and query the subscriber database 130 for the preferred content and notification preferences associated with unique identifier of the requesting subscriber operating the mobile device 105 or 107.

Information aggregation and filtering processing component 120 may periodically sense the location, compass heading, and speed of the user operating the mobile device 105 or 107, and accordingly send a request to the location-based content server 135. More particularly, the information aggregation and filtering component 120 is configured to apply filtering algorithms to nearby location-based content server 135, news feed server 140, and social network server 145 based on the preferred user content and notification preferences. For example, the information aggregation and filtering component 120 may apply filtering algorithms to select the most interesting and relevant information from data including: 1) local restaurant and shopping data returned from the location-based content server 135, 2) local news, weather, advertisement, or traffic information returned from the news feed server 140, or 3) the stream of social communication content associated with social-networking websites like "Facebook" (www.facebook.com) or "Twitter" (www.twitter.com) from the social network server 145. Still further, the information aggregation and filtering component 120 is also configured to compile the relevant data and return the personalized information to the mobile user interface 110 or web interface module 115 as an audio stream of information.

Figure 2:
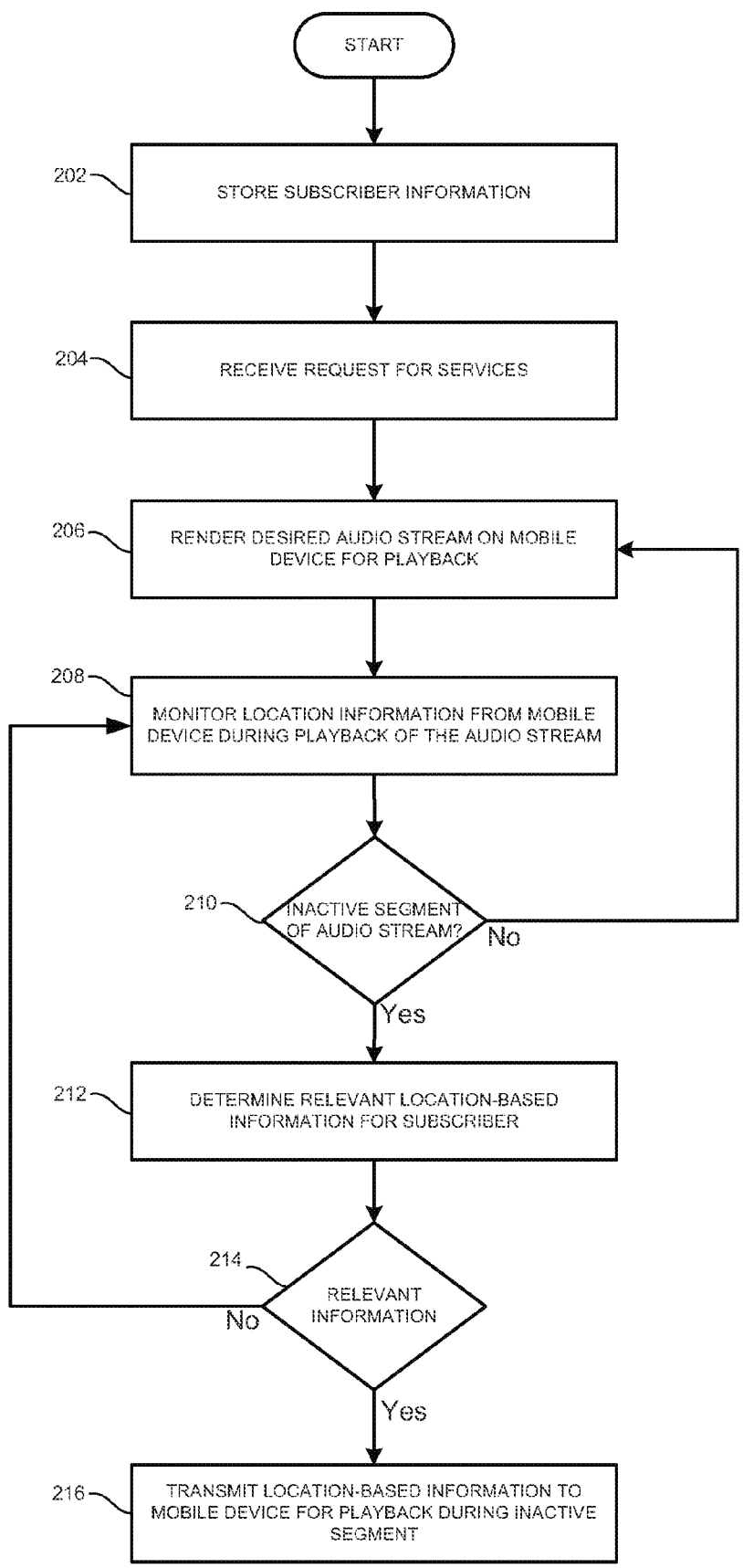
FIG. 2 illustrates the processing steps for delivering location-based audio services to a subscriber according to an embodiment of the present invention.

FIG. 2 illustrates the processing steps for delivering location-based audio services to a subscriber according to an embodiment of the present invention. In step 202, a user subscribes with the Service Provide System, which is configured to store the subscriber information in a database. Upon receiving a request for services from a subscribing user in step 204, the Service Provider System, via the information aggregation and filtering component, renders a desired audio stream for playback on the mobile device in step 206. The desired audio stream may be streaming audio such as a podcast, downloadable music content, audio clip, or text that may be voice synthesized on the mobile device, or any other similar audio broadcast. The rendering process may include simple playback of the desired audio stream on the device or voice synthesizing text on the mobile device, etc. Furthermore, the desired audio stream may change dynamically based on configuration updates from the user. According to an embodiment of the present invention, the desired audio stream includes at least one inactive segment, or break in the audio stream. As the audio stream is played on the mobile device, the Service Provider System monitors the location information, or global positioning, of the user and mobile device in step 208.

Next, in step 210 the Service Provide System determines if an inactive segment such as a gap or break in audio has occurred during playback of the desired audio stream. Once the inactive segment of the desired audio stream is reached, the Service Provider System then determines in step 212 whether there exists relevant location-based information for the subscriber based on the geographic data, stored subscriber profile information, and the information retrieved from the location-based content server, news feed server, and social network server. If no relevant location-based information is determined, the system may immediately transition to the next segment in the audio stream. However, if relevant location-based information is found by the Service Provider System, then in step 214, the relevant location-based information is transmitted to the mobile device for playback during the inactive segment of the audio stream. Alternatively, the Service Provider System may discover relevant location-based information during playback of the desired audio stream and queue all the complied relevant information for playback during the next inactive segment. In yet another embodiment, the Service Provider System may package a desired audio stream and fill in known inactive segments of the audio stream with relevant location-based information for playback at the conclusion of the current audio stream or file.

For example, as a user walks down the street listening to a desired podcast or musical entertainment on headphones coupled to the mobile device, the location-based audio service in accordance with embodiments of the present invention may either inform the user of the existence of, or simply present relevant location-based information or data such as local news events that occurred on the current street, or updates from associated social media websites. That is, the location-based audio service of the present embodiments is designed to be opportunistic such that the user is not required to actively search for location-based information, but rather to be informed of relevant content automatically while listening to entertaining audio content.

Figure 3A:
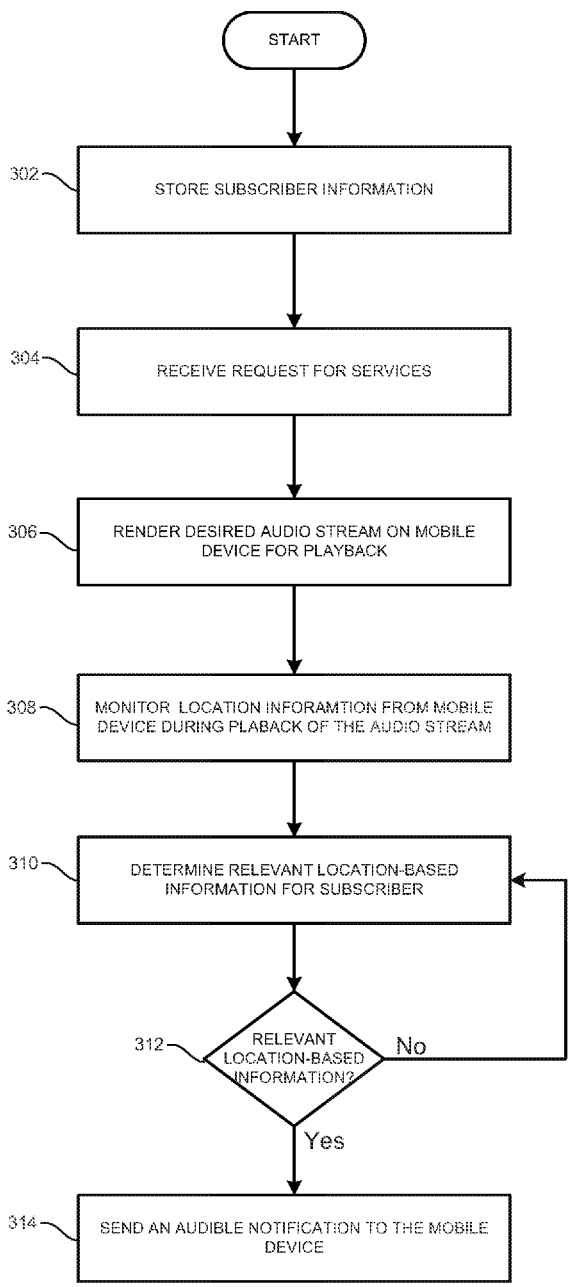
FIGS. 3A and 3B illustrate the processing steps for delivering location-based audio services according to another embodiment of the present invention.
Figure 3B:
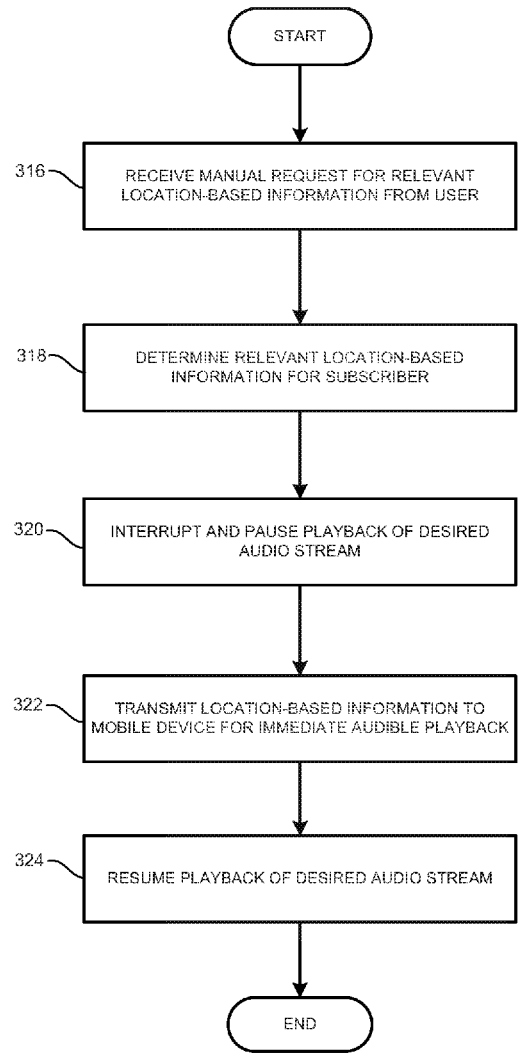

FIGS. 3A and 3B illustrate the processing steps for delivering location-based audio services according to another embodiment of the present invention. Like the previous embodiment, the user subscribes for services with the Service Provider System, which in turn, stores profile information associated with the subscriber in step 302. Thereafter, in step 304, the Service Provider System receives a request for services from the subscribing user, and in particular, a request for a desired audio stream (e.g. podcast) having an inactive segment therein. The inactive segment may be a known gap in audio stream designated by the Service Provider System as an insertion position for relevant location-based content, or an undesignated natural break between songs for example. In step 306, the desired audio stream is rendered for playback on the mobile device. For example, a desired podcast, having known gaps in the audio broadcast, is rendered for playback on the subscriber's mobile device. Next in step 308, location information such as the global positioning, compass heading, and speed of the user and mobile device is monitored by the Service Provider System. Based on this location information, the Service Provider System determines relevant location-base information for the subscriber in step 310. If, during the course of playback of the audio stream on the mobile, the system determines in step 312 that there is relevant location-based information to bring to the user's attention, the Service Provider System then provides an audible notification to the mobile device in step 314, but awaits manual permission from the user before interrupting the user as will be described in further detail with reference to FIG. 3B.

In step 316, the Service Provider System receives a manual request from the user for receiving additional details concerning the audible notification and associated location-based information. The manual request may be a button on the headset or mobile device, or an audible command for example. Thereafter, in step 318, relevant location-based information is determined based on the user's current location information, in addition to the last known or requested location-based information. According to one embodiment, playback of the desired audio stream on the mobile device is interrupted or paused by the Service Provider System in step 320, and the relevant location-based information is transmitted to the mobile device for immediate playback in step 322. Once the relevant location-based information is delivered and played back on the mobile device in its entirety, the Service Provider System may resume playback of the desired audio stream.

An exemplary operating environment of the location-based audio service of the present embodiment may involve a user visiting the website of the Service Provide System in order to subscribe to services by creating a user account and configuring their preferred content. According to one embodiment, the user may select "channels" of location-based content that is of interest (e.g. local news, restaurants, and movies), podcasts and other desired audio content, in addition to linking their active "Facebook" and "Twitter" accounts to the Service Provider System. At any time thereafter, the user may submit a request for services by opening a location-based audio service application associated with the Service Provider, and then logging on to the Service Provider System. As the user walks down a street listening to their favorite podcast, they may get within a predetermined distance of a restaurant associated with their preferred content. The Service Provider System may then send a discreet audible tone to the mobile device so as to indicate that there is a location of interest nearby. Subsequently, the user may submit a manual request via a button on the headset or an audible command for example, in order to learn more details about the nearby location of interest. More specifically, upon receiving the manual request for further details, the location-based audio service may submit a voice prompt as follows, "The restaurant ahead on the right, Rick's Cafe, is a top recommended Italian restaurant for Palo Alto" (given a stored subscriber preference for "Italian cuisine"). However, the user may also choose to continue walking and listening without receiving details concerning the point of interest. At the next street corner, the user may receive an audible alert and elect to listen to details concerning a news item about a robbery that occurred at the bank across the street the day before. Further down the street, the user may be read a new message from Facebook from a close friend (i.e. preferred content), or that another friend has "checked into" a nearby coffee shop on a location-base social network such as "Foursquare", (foursquare.com).

Figure 4:
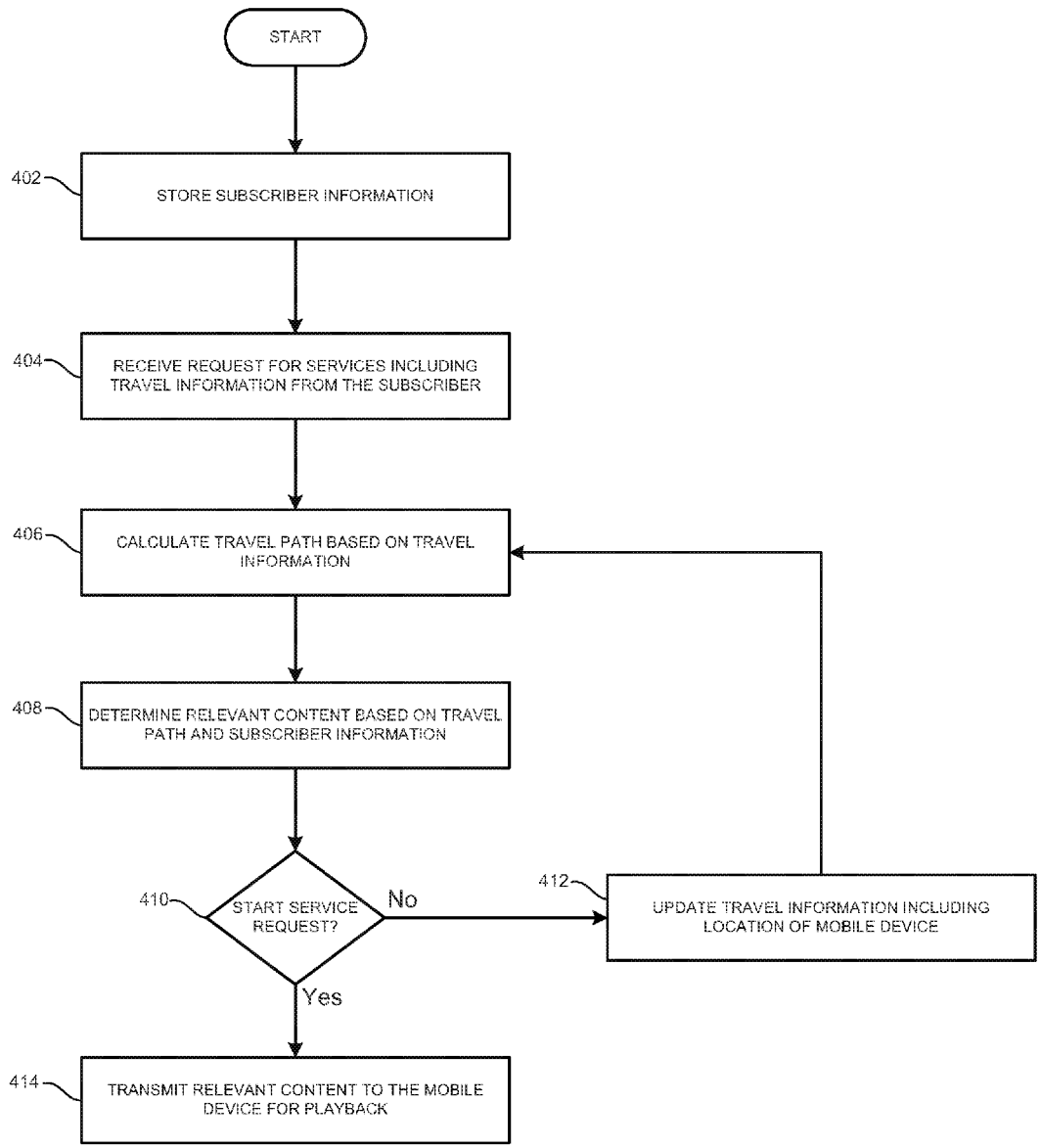
FIG. 4 illustrates the processing steps for delivering a personalized package of relevant location-based content to a subscriber according to an embodiment of the present invention.

FIG. 4 illustrates the processing steps for delivering a personalized package of relevant location-based content to a subscriber according to an embodiment of the present invention. As in the previous embodiments, a subscribing user enters identification and preferred content information for storage in the database associated with the Service Provider System in step 402. Next, in step 404, the user submits a request for services, which is received by the Service Provider System. Here, the request for services includes travel information, which may comprise of a current geographic position and a destination address. Then, in step 406, the Service Provider System calculates a travel path and duration based on the travel information input by the subscribing user. The Service Provider System may then, in step 408, determine a stream of relevant content based on the travel path and subscriber information stored in the database. Such relevant content may include a mix of news, audio entertainment, and updates that are most likely to be of interest to the user within the time allotted. Furthermore, the relevant content may be ordered based on priority and time-sensitivity given travel path of the user. If the request for location-based audio service is not immediately activated by the user in step 410, then the Service Provider System continually updates the travel information and global positioning of the mobile device in step 412. However, if the request is activated by the user, then in step 414, the Service Provider System transmits the audio stream of relevant content to the mobile device for immediate playback.

For example, a user in transit from Palo Alto, Calif. to Oakland, Calif. may start the location-based audio service application and enter a specific destination address. The system calculates the travel path using the received travel information, and based on the user's profile, preferences, network, and current geographic location, the Service Provider System creates an audio stream of relevant and prioritized content that is most likely to be of interest to the user in the time allotted. Here, the system may compile a stream of content that is about half an hour long and relevant to different points along the path the user is traveling for example. For instance, the user may receive audible information concerning traffic accidents on three stretches of highway along the travel path, or that a friend has checked into a gym across the street from the destination via "Foursquare."

Figure 5:
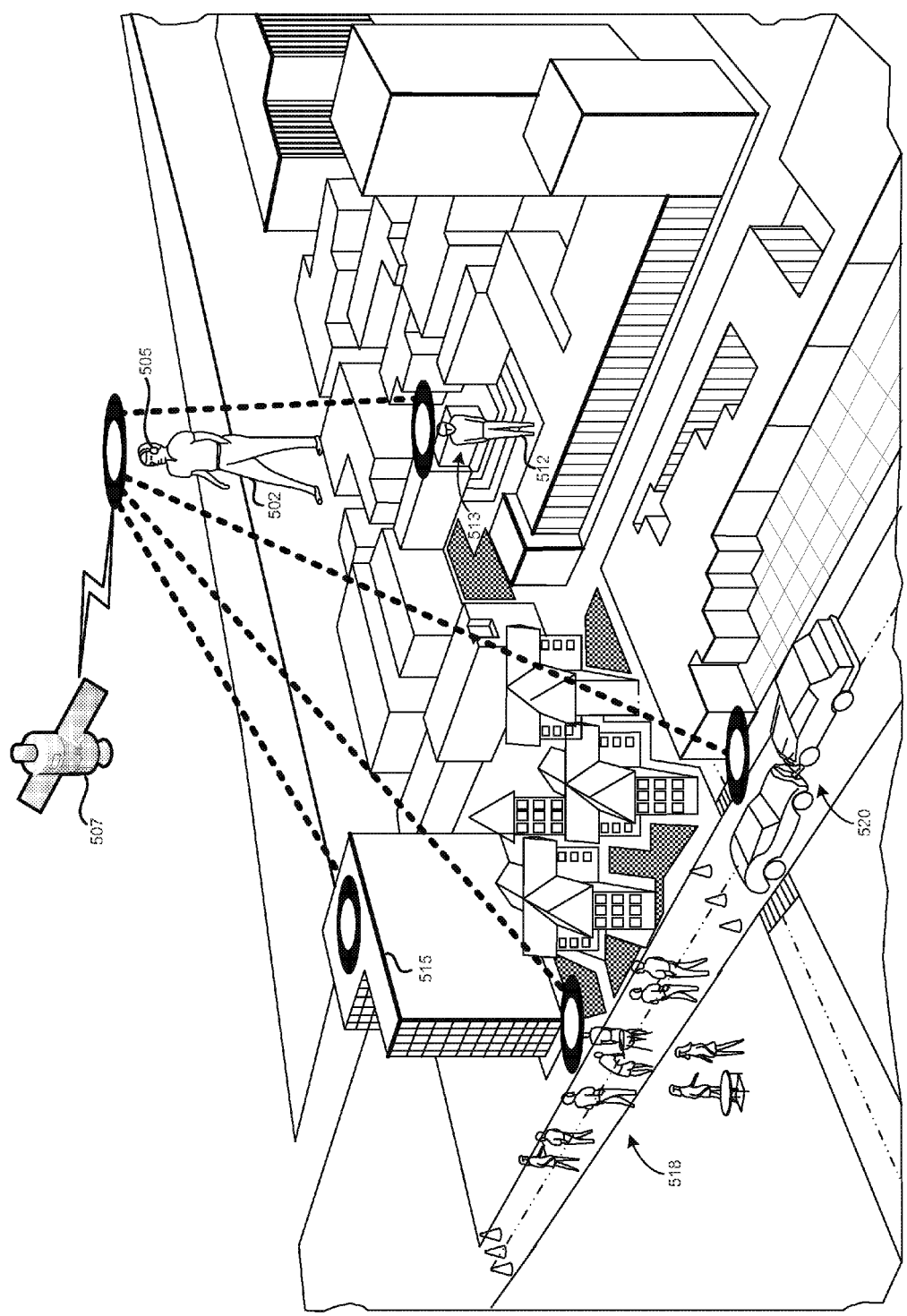
FIG. 5 depicts an example of an operating environment utilizing the location-based audio service in accordance with an embodiment of the present invention.

FIG. 5 depicts an example of an operating environment utilizing the location-based audio service in accordance with an embodiment of the present invention. As shown here, user 502 walks down a street listening to the location-based audio service via headphones 505 coupled to a mobile device. Satellite 507, which is connected to both the mobile device and components coupled to the Service Provider System, receives and transmits location information associated with the mobile device and points of interest 512, 515, 518, and 520. For example, user 502 may receive a notification or listen to information on the mobile device regarding a friend 512 who has checked into a nearby museum 513 via "foursquare." Still further, user 502 may receive a notification or listen to information on the mobile device regarding a shoe sale (preferred content) occurring at the nearby mall 515. Additionally, a notification or audio information concerning a neighborhood block party 518 and a nearby traffic accident 520 may be delivered to the mobile device operated by the user 502 (walking or driving) so as to indicate that unusual traffic may occur along the associated street. As such, the location-based audio service provides the user 502 with a relevant, personal, and enhanced reality experience.

Embodiments of the present invention disclose a streaming audio service for mobile users that delivers a mix location-based information, intelligently filtered social media updates, and personalized audio entertainment. Furthermore, many advantages are afforded by embodiments of the present invention. For example, a subscribing user can go about their everyday business—walking, driving, etc—and still be connected to location-specific information and entertainment from the internet without having to hold their devices in the air to survey the surrounding area as in conventional methods. Furthermore, as an audio-based system, the delivery of relevant location-based information requires an insignificant amount of the user's time. For example, the user does not need to view the mobile device's small-sized display screen for receiving such information. That is, delivery of relevant location-based information may occur instantly without the user dedicating great attention, or having a direct line of sight, to the visual area of the mobile device.

Furthermore, while the invention has been described with respect to exemplary embodiments, one skilled in the art will recognize that numerous modifications are possible. For example, although exemplary embodiments depict a smartphone and notebook computer as the mobile device, the invention is not limited thereto. For example, the mobile device may be a netbook, a tablet personal computer, standard cell phone, or any other portable electronic device configured with network connectivity.

Furthermore, the Service Provider System may include additional processing components, modules, or databases other than those discussed above and depicted in the figures. Similarly, external content that is to be filtered by the information aggregation and filtering component described above, may derive from any data source providing content over the internet such a web feed, weblog, or podcaster. In addition, the news feed may contain real-time as well as historical information pertaining to a particular location, venue, or event. Thus, although the invention has been described with respect to exemplary embodiments, it will be appreciated that the invention is intended to cover all modifications and equivalents within the scope of the following claims.

What is claimed is:

1. A method for providing information to a user operating a mobile device, the method comprising:
   receiving a request for services from the user via the mobile device, wherein the services include a desired audio stream having at least one inactive segment;
   transmitting the desired audio stream to the mobile device in response to receiving the request;
   monitoring geographic data from the mobile device while the audio stream is being rendered on the mobile device;
   determining relevant location-based information based on the geographic data from the mobile device; and
   transmitting the relevant location-based information to the mobile device for playback during the at least one inactive segment.

2. The method of claim 1, further comprising:
   storing, in a database, subscriber information and preferences associated with the user.

3. The method of claim 2, wherein the step of determining relevant location-based information is further based on the stored subscriber information and preferences of the user.

4. The method of claim 1, wherein the relevant location-based information includes news, entertainment, or information from a social networking website associated with the user.

5. The method of claim 1, wherein the desired audio stream includes one of a podcast audio or streaming digital music.

6. The method of claim 1, wherein the desired audio stream includes a plurality of inactive segments.

7. The method of claim 6, further comprising:
   transmitting the relevant location-based information to the mobile device for playback at each inactive segment of the plurality of inactive segments of the desired audio stream.

8. A method for providing information to a user operating a mobile device, the method comprising:
   receiving a request for services from the user via the obi le device, wherein the services include at least one desired audio stream;
   transmitting the desired audio stream to the mobile device in response to said request;
   monitoring geographic data from the mobile device while the audio stream is being rendered on the mobile device;
   determining relevant location-based information based on the geographic data from the mobile device; and
   sending, during playback of the desired audio stream, an audible notification to the user alerting the user to an availability of the relevant location-based information.

9. The method of claim 8, further comprising:
   storing subscriber information and preferences associated with the user.

10. The method of claim 9, wherein the step of determining relevant location-based information is based on the stored subscriber information and preferences of the user.

11. The method of claim 8, wherein the audio stream includes at least one inactive segment.

12. The method of claim 11, further comprising:
    transmitting the relevant location-based information to the mobile device for playback during the at least one inactive segment of the desired audio stream.

13. The method of claim 12, wherein the relevant location-based information is only transmitted to the mobile device upon receipt of an indication of manual activation by the user responsive to the audible notification.

14. The method of claim 8, further comprising:
    receiving a request for relevant location-based information from the user as a result of user interaction with the mobile device; and
    transmitting the relevant location-based information to the mobile device for playback in response to the request from the user.

15. The method of claim 8, further comprising:
    interrupting playback of the desired audio stream upon receiving request for location-based information;
    transmitting relevant location-based information to the mobile device for playback in response to the request from the user; and
    automatically resuming playback of the desired audio stream upon completion of the playback of the relevant location-based information on the mobile device.

16. A method for providing information to a user operating a mobile device, the method comprising:
    receiving a request for services from the user via the mobile device, wherein the request for services includes travel information;
    determining a stream of relevant content based on the travel information received from the user; and
    transmitting the stream of relevant content to the mobile device for playback.

17. The method of claim 16, wherein the travel information includes a current geographic location of the mobile device and destination data input by the user.

18. The method of claim 17, wherein determining a stream of relevant comprises:
    calculating a travel path based on the current geographic location of the mobile device and destination data input by the user: and
    determining relevant location-based information based on the calculated travel path.

19. The method of claim 18, further comprising:
    storing subscriber information and preferences associated with the user, and
    wherein the step of determining relevant a stream of relevant content is further based on the stored subscriber information and preferences of the user.

20. The method of claim 18, wherein the relevant content includes an audio stream, news, entertainment, or information from a social networking website associated with the user.

* * * * *

UNITED STATES PATENT AND TRADEMARK OFFICE
CERTIFICATE OF CORRECTION

PATENT NO. : 8,428,621 B2
APPLICATION NO. : 12/847058
DATED : April 23, 2013
INVENTOR(S) : W. Alex Vorbau et al.

It is certified that error appears in the above-identified patent and that said Letters Patent is hereby corrected as shown below:

In the Claims:

In column 7, line 65, in Claim 8, delete "obi le" and insert -- mobile --, therefor.

In column 8, line 59, in Claim 18, delete "user:" and insert -- user; --, therefor.

In column 8, line 65, in Claim 19, delete "determining relevant" and insert -- determining --, therefor.

Signed and Sealed this
Thirteenth Day of August, 2013

Teresa Stanek Rea
*Acting Director of the United States Patent and Trademark Office*